United States Patent
Cohen et al.

(10) Patent No.: US 11,268,771 B2
(45) Date of Patent: Mar. 8, 2022

(54) ENHANCED GAIN ANTENNA SYSTEMS EMPLOYING FRACTAL METAMATERIALS

(71) Applicant: Fractal Antenna Systems, Inc., Bedford, MA (US)

(72) Inventors: Nathan Cohen, Belmont, MA (US); Philip Salkind, Boston, MA (US)

(73) Assignee: FRACTAL ANTENNA SYSTEMS, INC., Bedford, MA (US)

( * ) Notice: Subject to any disclaimer, the term of this patent is extended or adjusted under 35 U.S.C. 154(b) by 319 days.

(21) Appl. No.: 16/168,396

(22) Filed: Oct. 23, 2018

(65) Prior Publication Data
US 2019/0128624 A1    May 2, 2019

Related U.S. Application Data

(63) Continuation-in-part of application No. 15/617,683, filed on Jun. 8, 2017, now Pat. No. 10,415,896, which
(Continued)

(51) Int. Cl.
*H01Q 17/00*  (2006.01)
*H01Q 15/00*  (2006.01)
(Continued)

(52) U.S. Cl.
CPC .............. *F28F 7/00* (2013.01); *F28F 13/003* (2013.01); *F41H 3/00* (2013.01); *F41H 3/02* (2013.01);
(Continued)

(58) Field of Classification Search
CPC ..................... H01Q 5/55; H01Q 13/06; H01Q 13/02–0283; H01Q 17/008; H01Q 15/0093
See application file for complete search history.

(56) References Cited

U.S. PATENT DOCUMENTS

| 1,434,167 A | 10/1922 | Thorner |
| 5,250,950 A | 10/1993 | Scherrer et al. |

(Continued)

FOREIGN PATENT DOCUMENTS

| CN | 105723079 | 6/2016 |
| KR | 10-2010-0072382 | 7/2010 |

(Continued)

OTHER PUBLICATIONS

Martinez Santa, et al. "Fractal Design Approach for Heat Sinks" Contemporary Engineering Sciences, vol. 10, No. 32, Publication, Dec. 19, 2017.

(Continued)

*Primary Examiner* — Dameon E Levi
*Assistant Examiner* — Jennifer F Hu
(74) *Attorney, Agent, or Firm* — Daly, Crowley, Mofford & Durkee, LLP (57) ABSTRACT

Systems and techniques are described that provide for enhanced gain and radiation characteristics of antennas. The systems and techniques employ layers or cards of fractal plasmonic surfaces to provide gain to the antennas. The fractal plasmonic surfaces each include a close-packed arrangements of resonators having self-similar or fractal shapes, which may be referred to as "fractal cells." The cards can be held by a frame adapted to fit an antenna. The FPS cards can provide benefits for gain, field emission, directivity, increased bandwidth, power delivery, and/or heat management. One or more dielectric layers or cards may be used to enhance gain and/or directivity characteristics.

4 Claims, 9 Drawing Sheets

Related U.S. Application Data is a continuation of application No. 15/296,729, filed on Oct. 18, 2016, now Pat. No. 9,677,824, which is a continuation of application No. 14/043,781, filed on Oct. 1, 2013, now Pat. No. 9,482,474.

(60) Provisional application No. 62/707,141, filed on Oct. 23, 2017, provisional application No. 61/855,380, filed on May 14, 2013, provisional application No. 61/744,651, filed on Oct. 1, 2012.

(51) Int. Cl.
| | | |
|---|---|---|
| H01Q 13/02 | (2006.01) | |
| F28F 7/00 | (2006.01) | |
| H02J 50/12 | (2016.01) | |
| G02B 1/00 | (2006.01) | |
| H02J 50/40 | (2016.01) | |
| F41H 3/00 | (2006.01) | |
| G02B 5/00 | (2006.01) | |
| F41H 3/02 | (2006.01) | |
| F28F 13/00 | (2006.01) | |
| F28F 3/02 | (2006.01) | |
| F28F 1/10 | (2006.01) | |
| F28F 7/02 | (2006.01) | |

(52) U.S. Cl.
CPC ............ *G02B 1/002* (2013.01); *G02B 5/008* (2013.01); *H01Q 13/02* (2013.01); *H01Q 15/0093* (2013.01); *H01Q 17/008* (2013.01); *H02J 50/12* (2016.02); *H02J 50/40* (2016.02); *F28F 1/10* (2013.01); *F28F 3/02* (2013.01); *F28F 7/02* (2013.01); *F28F 2215/10* (2013.01); *F28F 2245/06* (2013.01)

(56) References Cited

U.S. PATENT DOCUMENTS

| | | | |
|---|---|---|---|
| 6,104,349 A | 8/2000 | Cohen | |
| 6,127,977 A | 10/2000 | Cohen | |
| 6,140,975 A * | 10/2000 | Cohen | H01Q 1/243 343/792.5 |
| 6,363,268 B1 | 3/2002 | Schuchardt et al. | |
| 6,445,352 B1 | 9/2002 | Cohen | |
| 6,452,553 B1 | 9/2002 | Cohen | |
| 6,476,766 B1 | 11/2002 | Cohen | |
| 6,642,881 B1 | 11/2003 | Lawrence et al. | |
| 6,876,320 B2 | 4/2005 | Puente Baliarda | |
| 6,985,122 B2 | 1/2006 | Cohen | |
| 7,019,695 B2 | 3/2006 | Cohen | |
| 7,102,814 B1 | 9/2006 | Hughes | |
| 7,126,537 B2 | 10/2006 | Cohen | |
| 7,145,513 B1 | 12/2006 | Cohen | |
| 7,190,318 B2 * | 3/2007 | Cohen | H01Q 9/28 343/773 |
| 7,215,290 B2 | 5/2007 | Cohen | |
| 7,256,751 B2 | 8/2007 | Cohen | |
| 7,301,493 B1 | 11/2007 | Canales et al. | |
| 7,312,762 B2 * | 12/2007 | Puente Ballarda | H01Q 1/243 343/752 |
| 7,345,642 B2 | 3/2008 | Cohen | |
| 7,456,799 B1 * | 11/2008 | Cohen | H01Q 1/1242 343/773 |
| 7,994,962 B1 | 8/2011 | Ben-Shmuel | |
| 8,067,996 B2 | 11/2011 | Hillman et al. | |
| 8,253,639 B2 | 8/2012 | Cohen | |
| 8,378,877 B2 | 2/2013 | Tishin et al. | |
| 8,610,617 B1 | 12/2013 | Avouris et al. | |
| 8,860,607 B2 | 10/2014 | Shamim | |
| 8,878,741 B2 | 11/2014 | Mosallaei | |
| 8,917,210 B2 | 12/2014 | Dang | |
| 8,937,579 B2 | 1/2015 | Cohen | |
| 9,134,465 B1 | 9/2015 | Cohen | |
| 9,166,302 B2 | 10/2015 | Cohen | |
| 9,482,474 B2 | 11/2016 | Cohen | |
| 9,638,479 B2 | 5/2017 | Cohen | |
| 9,677,824 B2 | 6/2017 | Cohen | |
| 9,847,465 B2 | 12/2017 | Cohen | |
| 9,935,503 B2 | 4/2018 | Cohen | |
| 10,030,917 B1 | 7/2018 | Cohen | |
| 10,866,034 B2 | 12/2020 | Cohen | |
| 2001/0038325 A1 | 11/2001 | Smith | |
| 2005/0007289 A1 * | 1/2005 | Zarro | H01Q 13/02 343/786 |
| 2005/0012672 A1 * | 1/2005 | Fisher | H01Q 13/085 343/767 |
| 2007/0028958 A1 | 2/2007 | Retti | |
| 2007/0236406 A1 | 10/2007 | Wen et al. | |
| 2008/0024792 A1 | 1/2008 | Pendry | |
| 2009/0135042 A1 | 5/2009 | Umishita et al. | |
| 2009/0207087 A1 | 8/2009 | Fang | |
| 2010/0126566 A1 | 5/2010 | Ji | |
| 2010/0288116 A1 | 11/2010 | Cincotti | |
| 2010/0330348 A1 | 12/2010 | Lenz | |
| 2011/0050360 A1 | 3/2011 | Cohen et al. | |
| 2011/0063189 A1 * | 3/2011 | Cohen | H01Q 1/288 343/899 |
| 2013/0208332 A1 | 8/2013 | Yu | |
| 2014/0090828 A1 * | 4/2014 | Cohen | H02J 50/12 165/185 |
| 2015/0247297 A1 | 9/2015 | Protzmann | |
| 2019/0260131 A1 * | 8/2019 | Cohen | H01Q 13/085 |

FOREIGN PATENT DOCUMENTS

| | | | |
|---|---|---|---|
| WO | 2011138670 | 11/2011 | |
| WO | WO 2011/138670 | 11/2011 | |
| WO | WO 2014/05573 | 4/2014 | |
| WO | WO-2018039669 A1 * | 3/2018 | ........... H01Q 1/2216 |

OTHER PUBLICATIONS

International Search Report and Written Opinion dated Mar. 25, 2019 for International Application No. PCT/US18/67442 filed Dec. 24, 2018 by Fractal Antenna Systems, Inc., 14 pages.

International Search Report and the Written Opinion from corresponding PCT Application No. PCT/US2013/062940 dated Jan. 23, 2014.

Veselago, "A Soviet 'Reviews of Modern Physics,'" Seminal Paper in Soviet Physics, USPEKHI, 10:509-514 (1968).

Extended European Search Report for corresponding European Application No. 18194500.7 dated Nov. 14, 2018.

Trinh-Van et al., "A Wideband Circularly Polarized Pixelated Dielectric Resonator Antenna," Sensors, 2016, Publication (online). Aug. 23, 2016 [retrieved Dec. 31, 2018] Retrieved from the internet: <URL: https://www.mdpi.cpm/1424-8220/16/9/1349/htm.; pp. 1-7.

Keyrouz et al., "Dielectric Resonator Antennas: Basic Concepts, Design Guidelines, and Recent Developments at Millimeter-Wave Frequencies," International Journal of Antennas and Propagation, vol. 2016, Publication [online]. Oct. 2009 [retrieved Dec. 31, 2018]. Retrieved from the internet: <URL: https://www.hindawi.com/journals/ijap/2016/6075680/>, pp. 1-21.

International Search Report and the Written Opinion from corresponding PCT Application No. PCT/US2018/061842 dated Jan. 18, 2019.

International Preliminary Report on Patentability for PCT/US2018/067442 filed Dec. 24, 2018 for Fractal Antenna Systems, Inc., 7 pages.

International Preliminary Report on Patentability for PCT/US2018/061842 filed Nov. 19, 2018 for Fractal Antenna Systems, Inc., 4 pages.

* cited by examiner

ENHANCED GAIN ANTENNA SYSTEMS EMPLOYING FRACTAL METAMATERIALS

CROSS-REFERENCE TO RELATED APPLICATIONS

This application is a continuation-in-part of U.S. application Ser. No. 15/617,683, filed 8 Jun. 2017, and entitled "Radiative Transfer and Power Control with Fractal Metamaterial and Plasmonics," which is a continuation of U.S. application Ser. No. 15/296,729, filed 18 Oct. 2016 and entitled "Radiative Transfer and Power Control with Fractal Metamaterial and Plasmonics", which is a continuation of U.S. application Ser. No. 14/043,781, filed 1 Oct. 2013, which claims priority to U.S. Provisional Patent Application No. 61/744,651, filed 1 Oct. 2012 and entitled "Radiative Transfer and Power Control with Fractal Metamaterial and Plasmonics"; and U.S. Provisional patent Application No. 61/855,380, filed 14 May 2013 and entitled "Radiative Transfer and Power Control with Fractal Metamaterial and Plasmonics"; this application further claims the benefit of and priority to U.S. Provisional Patent Application No. 62/707,141, filed 23 Oct. 2017, and entitled "Enhanced Gain Antenna System"; the entire content of all of which noted applications is incorporated herein by reference.

BACKGROUND

So-called horn antennas—which may be considered as flared waveguides—are commonly used in many RF application, as they afford a number of benefits. These benefits include simple construction, relatively adequate directivity of beam pattern, bandwidth of about 10%, and the potential relatively high gain when used in conjunction with a parabolic reflector.

Horn antennas, however, are subject to a number of significant disadvantages. For example, horn antennas typically radiate energy having a spherical wave front shape. As a result, such horn antenna produces beams (radiation lobe patterns) with limited or poor directivity. Moreover, such horn antennas typically have limited gain—unless used with a large form-factor parabolic reflector. The typical gain limit of a horn antenna is approximately 20 dB due to the fact that in order to increase the gain, the whole size of the horn is increased. Increasing the size of the horn opening produces a commensurate increase in the length of the horn. At some point the length of the horn becomes excessive or impractical.

SUMMARY

The present disclosure is directed to systems and techniques that provide for enhanced gain and radiation characteristics of antennas. The systems and techniques employ layers or cards of fractal plasmonic surfaces ("FPS cards") to provide gain to the antennas. The fractal plasmonic surfaces each include a close-packed arrangement of resonators having self-similar or fractal shapes, which may be referred to as "fractal cells." The fractal cells are placed sufficiently close to one another (e.g., less than ⅙ wavelength, ⅛ wavelength, 1/10 wavelength, 1/12 wavelength, 1/15 wavelength, 1/16 wavelength, 1/20 wavelength) so that a surface (plasmonic) wave causes near replication of current present in one fractal cell in an adjacent fractal cell. A fractal of such a fractal cell can be of any suitable fractal shape and may have two or more iterations. The fractal cells may lie on a flat or curved sheet or layer and be composed in layers for wide bandwidth or multi-bandwidth transmission. The area of a surface (e.g., sheet) and its number of fractals determines the gain relative to a single fractal cell. As each cell is fed plasmonically (via plasmonic coupling) rather than directly, "dead" or covered or out of resonance cells do not alter the ability of the other cells to work. The boundary edges or faces of the surface may be terminated resistively so as to not degrade the cell performance at the edges. These surfaces may be referred to as fractal plasmonic surfaces and can provide benefits for gain, field emission, directivity, increased bandwidth, power delivery, and/or heat management. The one or more FPS cards are positioned near or adjacent to one or more antennas so as to provide improved gain and/or directivity for the one or more antennas. A frame can be used to hold the one or more FPS cards. One or more layers or cards of dielectric material may be used with the FPS card(s) in some embodiments. The one or more FPS cards, and the one or more dielectric cards (when present), may be used with the frame as a retrofit apparatus, system, or kit for application to one or more preexisting antennas in exemplary embodiments of the present disclosure.

Exemplary embodiments of the present disclosure can provide techniques, including systems and/or methods, for improving the gain and directivity of preexisting antennas. Representative frequencies of operation can include, but are not limited to, those over a range of 500 MHz to 1.3 GHz, though others may of course be realized: e.g., 5.9 GHz, 600 MHz to 6 GHZ; 3.3 GHz to 4.2 GHz; in millimeter-wave bands, e.g., 24-86 GHz, including 26 GHz, 28 GHz, 38 GHz, and 42 GHz, 27.5-28.35 GHz, 27-40 GHz, 26.5-29.5 GHz, 27.5-28.28 GHz, 24.25-27.f GHz, 37-43.5 GHz, 26.5-27.5 GHz, 24.5-27.5 GHz; as well as bands at (or bracketing) 600 MHz, 700 MHz, 800 MHz, 900 MHz, 1.5 GHz, 2.1 GHz, 2.3 GHz and 2.6 GHz, as just some examples. Operation at other frequencies, including for example those of visible light, infrared, ultraviolet, and as well as microwave EM radiation, e.g., K, Ka, X-bands, etc. may be realized, e.g., by appropriate scaling of dimensions and selection of shape of the resonator elements. In some embodiments, the effects produced by such techniques can include cloaking, obfuscation, obscuration, or invisibility of an object at the noted wavelengths or bands.

It should be understood that other embodiments of FPS systems and methods according to the present disclosure will become readily apparent to those skilled in the art from the following detailed description, wherein exemplary embodiments are shown and described by way of illustration. The systems and methods of the present disclosure are capable of other and different embodiments, and details of such are capable of modification in various other respects. Accordingly, the drawings and detailed description are to be regarded as illustrative in nature and not as restrictive.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Systems and techniques according to the present disclosure provide for desired transfer of radiation by using close packed arrangements of resonators having fractal shapes, i.e., "fractal cells." Systems and techniques according to the present disclosure provide one or more surfaces that act or function as heat or power radiating surfaces for which at least a portion of the radiating surface includes or is composed of "fractal cells" (small fractal shapes) (as antennas or resonators) placed sufficiently close to one another (e.g., less than 1/20 wavelength) so that a surface (plasmonic) wave causes near replication of current present in one fractal cell in an adjacent fractal cell. A fractal of such a fractal cell can be of any suitable fractal shape and may have two or more iterations. The fractal cells may lie on a flat or curved sheet or layer and be composed in layers for wide bandwidth or multi-bandwidth transmission. The area of a surface (e.g., sheet) and its number of fractals determines the gain relative to a single fractal cell. As each cell is fed plasmonically (via plasmonic wave propagation) rather than directly, "dead" non-functional or covered or out of resonance cells do not alter the ability of the other cells to work. The boundary edges of the surface may be terminated resistively so as to not degrade the cell performance at the edges. These surfaces may be referred to as fractal plasmonic surfaces (FPS's).

Such a fractal plasmonic surface (FPS) may be used to transfer radiation, e.g., via evanescent wave transfer. In doing so such surfaces can be used to remove radiative power and/or heat from one location to another, or divert it to another location. Such surfaces may be used to essentially diffuse power delivered to a part of the FPS and dissipate and or distribute it to other specific parts or globally. Heat for example, may be dissipated in this way, or a power "hotspot" supplied or hit with localized power may have the power spread out or diverted to other desired locations, e.g., different areas of a related machine or structure. In some embodiments, a FPS on a closed or curved surface may act as a cloaking device to divert power (in a wavelength or frequency of interest) from one side of the device to the other. In other embodiments, a refrigeration or cooling effect may be induced by transferring heat away from a FPS.

In some embodiments, power control may also be achieved through wideband absorption by placing a resistive sheet at the edge of the fractal cells, creating a layer adjacent to the cells. Impinging electromagnetic radiation will be absorbed and not reflected or scattered. A FPS may be used to wireless couple a device for power transmission by placing the power as electromagnetic radiation on the FPS and then physically placing the (to be) powered device closely to the FPS. A FPS may also work even if some of the cells are damaged or missing as a variety of paths exists to convey the plasmonic transmission. A FPS may also be used to diffuse power away from one location to another or dissipate it so as to decrease "hotspots." Heating and cooling as a wideband speed of light heat-like pipe may also be done with the FPS.

Exemplary embodiments of the present disclosure can provide techniques, including systems and/or methods, for cloaking objects at certain wavelengths/frequencies or over certain wavelength/frequency ranges (bands). Such techniques can provide an effective electromagnetic lens and/or lensing effect for certain wavelengths/frequencies or over certain wavelength/frequency ranges (bands). In some embodiments, the effects produced by such techniques can include cloaking or so-called invisibility of the object(s) at the noted wavelengths or bands. Representative frequencies of operation can include, but are not limited to, those over a range of 500 MHz to 1.3 GHz, though others may of course be realized. Operation at other frequencies, including for example those of visible light, infrared, ultraviolet, and as well as microwave EM radiation, e.g., K, Ka, X-bands, etc. may be realized, e.g., by appropriate scaling of dimensions and selection of shape of the resonator elements.

Exemplary embodiments of the present disclosure can include a novel arrangement of resonators in a lattice-like configuration. The arrangements can include resonators of several different sizes and/or geometries arranged so that each size or geometry ("grouping") corresponds to a moderate or high quality factor, "Q," (that is moderate or low bandwidth) response that resonates within a specific frequency range.

For exemplary embodiments, fractal resonators can be used for the resonators in such structures because of their control of passbands, and smaller sizes compared to non-fractal based resonators. Their benefit arises from a size standpoint because they can be used to shrink the resonator(s) while control of passbands can reduce or eliminates issues of harmonic passbands that would resonate at frequencies not desired.

Further embodiments of the present disclosure are directed to scatterer or scattering structures. Additional embodiments of the present disclosure are directed to structures/techniques for activating and/or deactivating cloaking structures.

Related fractal technology is described in the following: (i) U.S. Provisional Patent Application No. 61/163,824, filed 26 Mar. 2009 and entitled "Cloaking Techniques"; (ii) U.S. Provisional Patent Application No. 61/163,837, filed 26 Mar. 2009 and entitled "Scatterer"; (iii) U.S. Provisional Patent Application No. 61/163,913, filed 27 Mar. 2009 and entitled "Cloaking Techniques"; and, (iv) U.S. Provisional Patent Application No. 61/237,360, filed 27 Aug. 2009 and entitled "Switching System for Cloak On Command"; the entire contents of all of which applications are incorporated herein by reference.

For exemplary embodiments, fractal resonators can be used for the resonators because of their control of passbands, and smaller sizes. A main benefit of such resonators arises from a size standpoint because they can be used to shrink the resonator(s), while control of passbands can reduce/mitigate or eliminate issues of harmonic passbands that would resonate at frequencies not desired.

Exemplary embodiments of a resonator system for use at infrared (or nearby) frequencies can be built from belts or loops having fractal cells on one or both sides. These belts or loops can function to slip the infrared (heat) energy around an object located within the belts, so the object is effectively invisible and "see thru" at the infrared frequencies. Belts, or shells, having similar closed-packed arrangements for operation at a first passband can be positioned within a wavelength of one another, e.g., $\frac{1}{10}$k, $\frac{1}{8}$k, $\frac{1}{4}$k, $\frac{1}{2}$ λ, etc.

In cloak embodiments, as described in further detail below, an observer can observe an original image or signal, without it being blocked by the cloaked object. Using no power, the fractal cloak having FPS can replicate the original signal (that is, the signal before blocking) with great fidelity. Exemplary embodiments can function in the infrared region (e.g., ~700 nm to 1 mm, corresponding to ~430 THz to ~300 GHz), providing 3:1 bandwidth; operation within or near such can frequencies can provide other bandwidths as well, such as 1:1 up to 2:1 and up to about 3:1.

Figure 1:
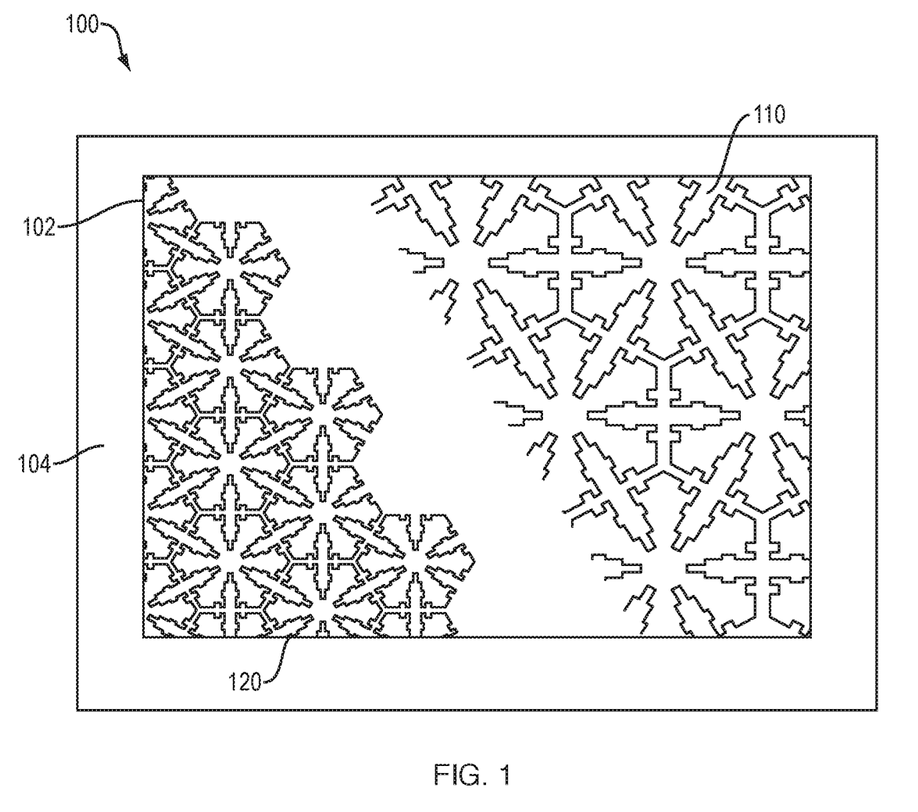
FIG. 1 depicts a diagrammatic plan view of a fractal plasmonic surface (FPS), in accordance with exemplary embodiments of the present disclosure.

FIG. 1 depicts a radiative system 100 having a fractal plasmonic surface (FPS), in accordance with the present disclosure. The FPS 102 includes close packed arrangements of resonators having fractal shapes (e.g., "fractal cells") as denoted by 110 and 120. The FPS 102 may be part of a larger surface or area 104. The individual fractal cells are separated from the adjacent fractal cells but are sufficiently close to one another (e.g., less than $\frac{1}{20}$ wavelength) so that a surface (plasmonic) wave causes near replication of current present in one fractal cell in an adjacent fractal cell. While preferred fractal shapes are shown in FIG. 1 as being hexagonal or snowflake-like, any suitable fractal shape (e.g., deterministic) may be used and such a fractal may have two or more iterations. The fractal cells may lie on a flat or curved sheet or layer and be composed in layers for wide bandwidth or multi-bandwidth transmission. Each layer holding a FPS can utilize fractal cells of different size and shape that those of another layer.

Examples of suitable fractal shapes (for use for shells and/or a scatting object) can include, but are not limited to, fractal shapes described in one or more of the following patents, owned by the assignee of the present disclosure, the entire contents of all of which are incorporated herein by reference: U.S. Pat. Nos. 6,452,553; 6,104,349; 6,140,975; 7,145,513; 7,256,751; 6,127,977; 6,476,766; 7,019,695; 7,215,290; 6,445,352; 7,126,537; 7,190,318; 6,985,122; 7,345,642; and, 7,456,799.

Other suitable fractal shape for the resonant structures can include any of the following: a Koch fractal, a Minkowski fractal, a Cantor fractal, a torn square fractal, a Mandelbrot, a Caley tree fractal, a monkey's swing fractal, a Sierpinski gasket, and a Julia fractal, a contour set fractal, a Sierpinski triangle fractal, a Menger sponge fractal, a dragon curve fractal, a space-filling curve fractal, a Koch curve fractal, a Lypanov fractal, and a Kleinian group fractal. While exemplary fractal shapes are shown in FIG. 1, the present disclosure is not limited to such and any other suitable fractal shapes (including generator motifs) may be used in accordance with the present disclosure. The fractal cells 110 and 120 can be formed on the FPS 102 by any suitable techniques. Such techniques can include additive and/or subtractive techniques. Suitable lithography techniques may be used for some embodiments. In exemplary embodiments, the fractal shapes of the fractal cells 110 and 120 can be conductive traces that are deposited on the underlying surface, e.g., a suitable substrate. Any suitable deposition techniques can be utilized. In other embodiments, the fractal cells 110 and 120 can be etched or engraved onto a surface. Any suitable micromachining or nanomachining techniques may be used.

Exemplary embodiments of system 100 can utilize a material for a substrate that has low-loss characteristics in the infrared region to facilitate heat transfer by fractal cells disposed on, disposed in, or supported by the substrate, e.g., on a supporting surface provided by the substrate. Examples of suitable materials for such substrates can include, but are not limited to, the following: chalcogenide-glasses in general; high-purity As—S, As—Se, Ge—As—Se glasses; and, Ge30Asi0Se30Te30 glass, and the like.

Figure 2:
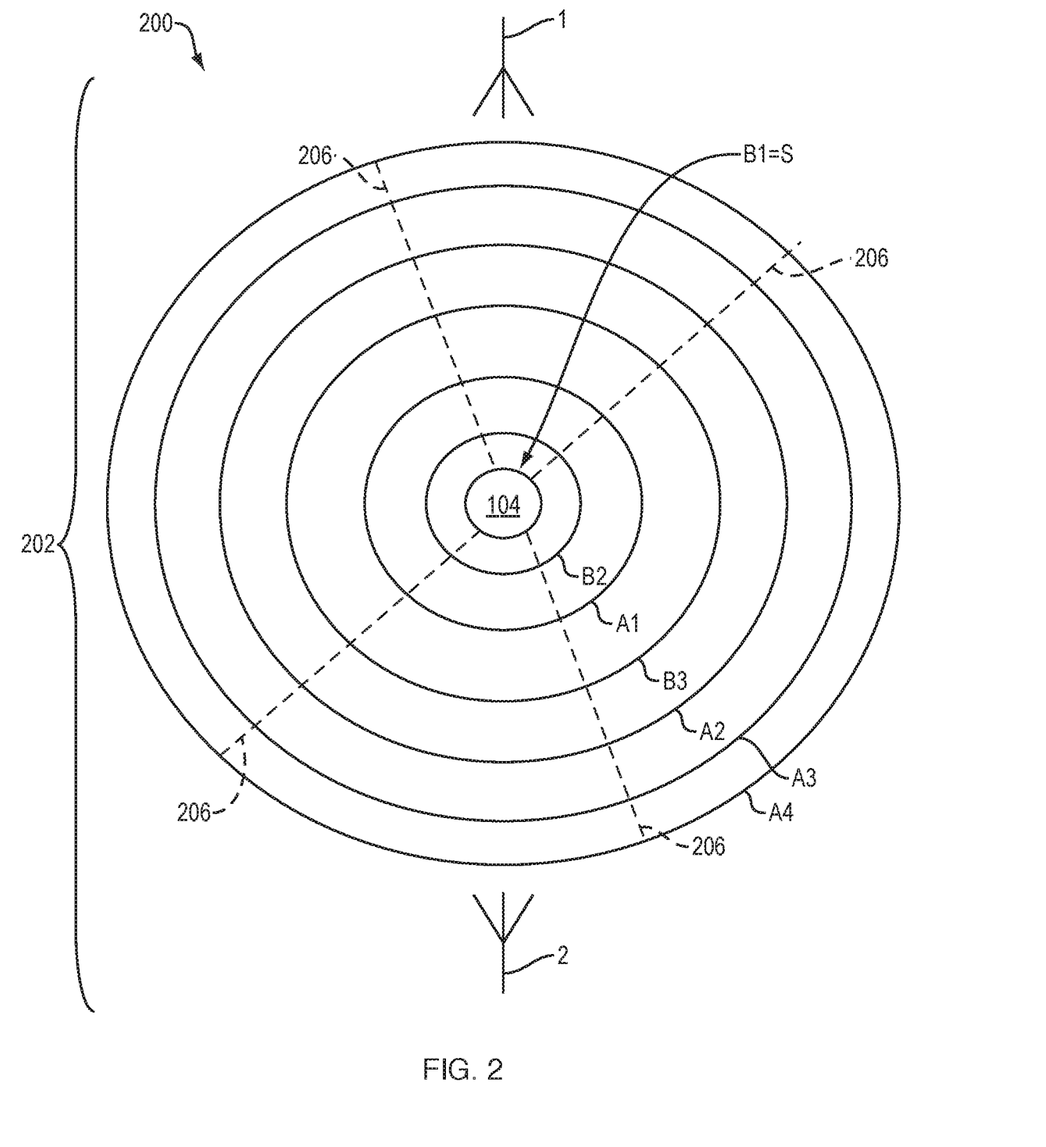
FIG. 2 depicts a diagrammatic plan view of a resonator cloaking system utilizing a number of cylindrical shells, in accordance with exemplary embodiments of the present disclosure.

FIG. 2 depicts a diagrammatic plan view of a cloaking system 200 and RF testing set up in accordance with exemplary embodiments of the present disclosure. As shown in FIG. 2, a number of concentric shells (or bands) 202 are placed on a platform (parallel to the plane of the drawing). The shells include a flexible substrate (e.g., polyimide with or without composite reinforcement) with conductive traces (e.g., copper, silver, etc.) in fractal shapes or outlines. The shells 202 surround an object to be cloaked (shown as 204 in FIG. 1). A transmitting antenna 1 and a receiving antenna 2 are configured at different sides of the system 200, for the purposes of illustration. The shells 202 can be held in place by radial supports 206.

The shells indicated in FIG. 2 are of two types, one set (A1-A4) configured for optimal operation over a first wavelength/frequency range, and another set (B1-B3) configured for optimal operation over a second wavelength/frequency range. (The numbering of the shells is of course arbitrary and can be reordered, e.g., reversed.)

For an exemplary embodiment of system 200, the outer set of shells (A1-A4, with A1 being the innermost and A4 the outmost) had a height of about 3 to 4 inches (e.g., 3.5 inches) and the inner set of shells had a height of about 1 inch less (e.g., about 2.5 to 3 inches). The spacing between the shells with a larger fractal shape (A1-A4) was about 2.4 cm while the spacing between shells of smaller fractal generator shapes (B1-B3) was about 2.15 cm (along a radial direction). In a preferred embodiment, shell A4 was placed between shell B2 and B3 as shown. The resonators formed on each shell by the fractal shapes can be configured so as to be closely coupled (e.g., by capacitive and/or evanescent-wave coupling) and function to propagate energy by a plasmonic wave.

It will be appreciated that while, two types of shells and a given number of shells per set are indicated in FIG. 2, the number of shell types and number of shells for each set can be selected as desired, and may be optimized for different applications, e.g., wavelength/frequency bands, including the optical bands, i.e., infrared, visible, and ultraviolet, as well as x-ray.

Figure 3:
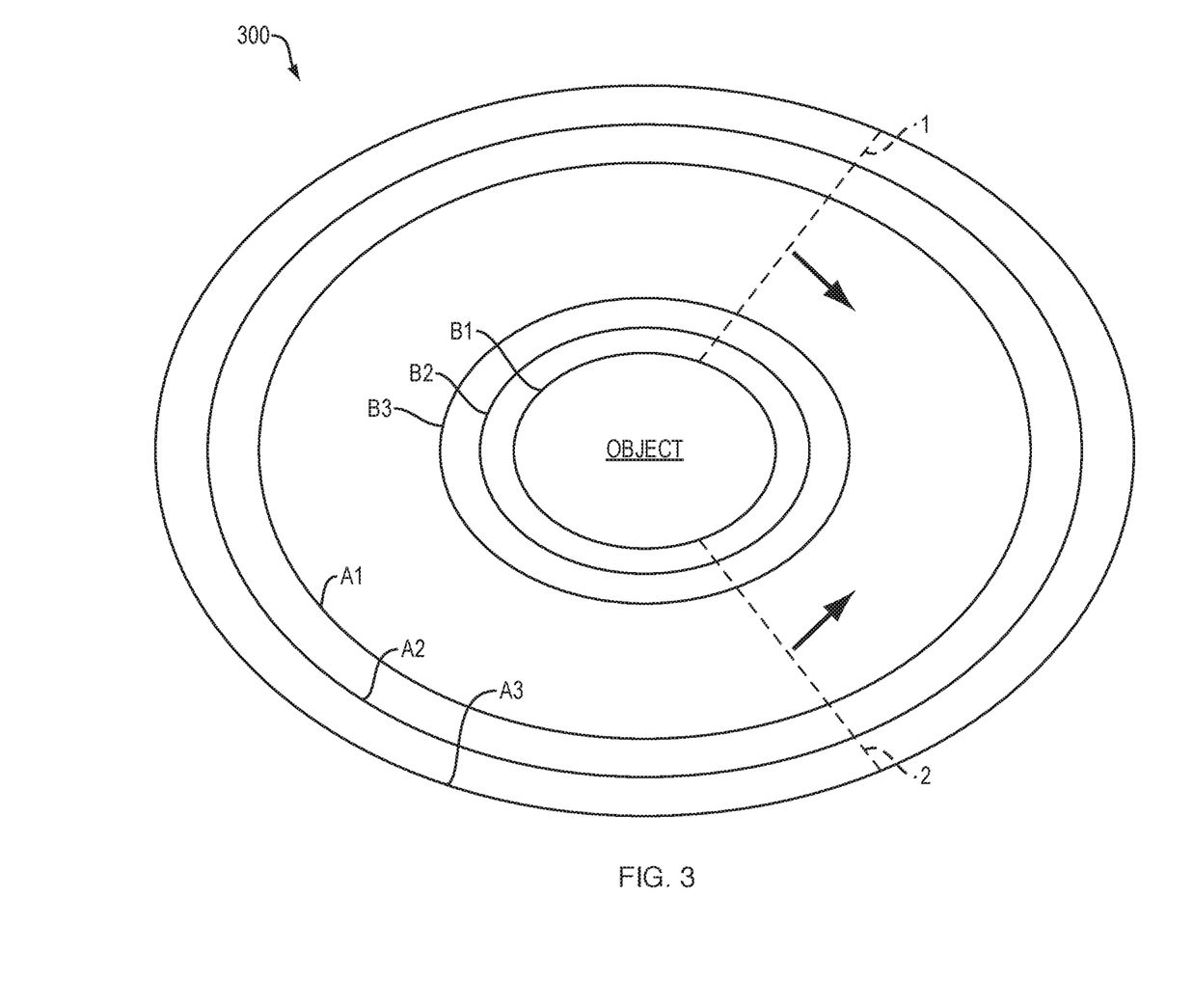
FIG. 3 depicts a diagrammatic plan view of a resonator cloaking system utilizing a number of shells having an elliptical cross-section, in accordance with an alternate embodiment of the present disclosure.

FIG. 3 depicts a diagrammatic plan view of a cloaking system (or electrical resonator system) according to an alternate embodiment in which the individual shells have an elliptical cross section. As shown in FIG. 3, a system 300 for cloaking can include a number of concentric shells (or bands) 302. These shells can be held in place with respect to one another by suitable fixing means, e.g., they can be placed on a platform (parallel to the plane of the drawing) and/or held with a frame. The shells 302 can include a flexible substrate (e.g., polyimide with or without composite reinforcement) with a close-packed arrangement of electrically conductive material formed on the first surface. As stated previously for FIG. 2, the closed-packed arrangement can include a number of self-similar electrical resonator shapes. The resonator shapes can be made from conductive traces (e.g., copper, silver, gold, silver-based ink, etc.) having a desired shape, e.g., fractal shape, split-ring shape, and the like. The shells 302 can surround an object to be cloaked, as indicated in FIG. 3.

As indicated in FIG. 3 (by dashed lines 1 and 2 and arrows), the various shells themselves do not have to fowl closed surfaces. Rather, one or more shells can foul' open surfaces. This can allow for preferential cloaking of the object in one direction or over a given angle (e.g., a given solid angle). Moreover, while dashed lines 1 and 2 are shown intersecting shells B I-B3 and A1-A3 of system 300, one or more shells of each group of shells (B1-B3 and A 1-A3) can be closed while others are open. Additionally, it should be appreciated that the cross-sections shown for each shell can represent closed geometric shapes, e.g., spherical and ellipsoidal shells.

As indicated previously, each shell of a cloaking system (e.g., system 300) can include multiple resonators in one or multiple close-packed configurations. The resonators can be repeated patterns of conductive traces. These conductive traces can be closed geometric shapes, e.g., rings, loops, closed fractals, etc. The resonator(s) can be self-similar to at least second iteration. The resonators can include split-ring shapes, for some embodiments. The resonant structures are not required to be closed shapes, however, and open shapes can be used for such.

In exemplary embodiments of shell 300, the closed loops can be configured as fractals or fractal-based shapes, e.g., as depicted by fractal cells 110 and 120 in FIG. 1. The dimensions and type of a fractal shape for a fractal cell can be the same for each shell type but can vary between shell types. This variation (e.g., scaling of the same fractal shape) can afford increased bandwidth for the cloaking characteristics of the system. This can lead to periodicity of the fractal shapes of common shell types but aperiodicity between the fractal shapes of different shell types.

It will be appreciated that the resonant structures of the shells may be formed or made by any suitable techniques and with any suitable materials. For example, semiconductors with desired doping levels and dopants may be used as conductive materials. Suitable metals or metal containing compounds may be used. Suitable techniques may be used to place conductors on/in a shell, including, but not limited to, printing techniques, photolithography techniques, etching techniques, and the like.

It will also be appreciated that the shells may be made of any suitable material(s). Printed circuit board materials may be used. Flexible circuit board materials are preferred. Other material may, however, be used for the shells and the shells themselves can be made of noncontinuous elements, e.g., a frame or framework. For example, various plastics may be used. In exemplary embodiments, the underlying surface or substrate on which a FPS is formed can have low loss with respect to the type of radiation that the FPS is designed for, so as to facilitate the intended heat and/or power transfer or dissipation.

Exemplary embodiments of the present disclosure can provide techniques, including systems and/or methods, for providing a radar cross section of different sizes than as would otherwise be dictated by the physical geometry of an object. Such techniques (objects/methods) can be useful for implementations such as radar decoys where a given object (decoy) is made to appear in radar cross section as like another object (e.g., missile). Representative frequencies of operation can include those over a range of 500 MHz to 1.3 GHz, though others may of course be realized. Other frequencies, include those of visible light may be realized, e.g., by appropriate scaling of dimensions and selection of shape of fractal elements.

Figure 4A:
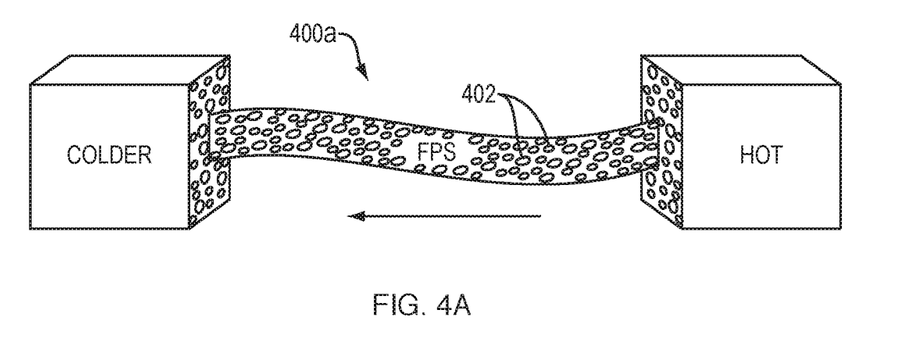
FIGS. 4A, 4B, and 4C depict an example of a FPS in three different configurations, shown in views (A)-(C)

FIG. 4 depicts an example of a FPS 400 in three different configurations, shown in views (A)-(C). In view (A), the FPS 400A is shown physically coupled between two objects, a hot object and a colder object. Heat, in the form of radiative infrared energy, flows from the hot object to the colder object via plasmonic coupling between fractal cells 402 of the FPS 400A.

Figure 4B:
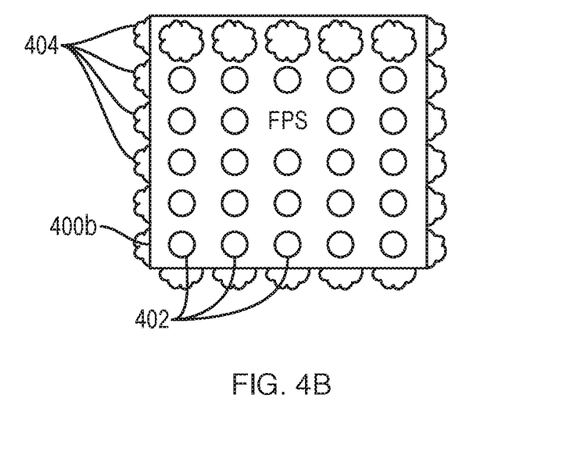
Figure 4C:
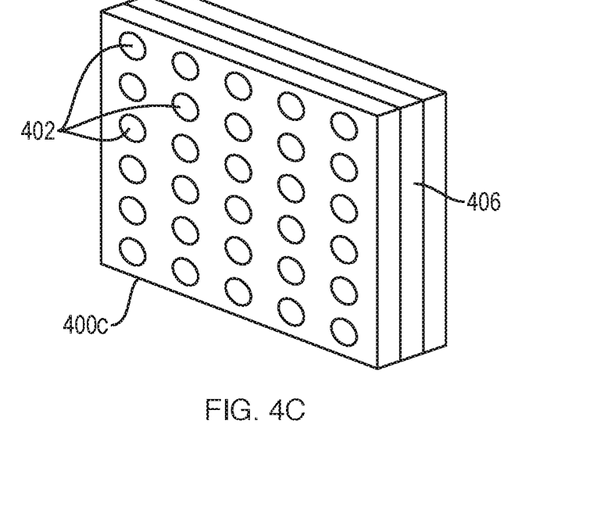

In view (B), a configuration of FPS 400B is shown having resistive ends 404 in addition to the fractal cells 402. The resistive ends 404 may be made of any suitable resistive material and my any suitable techniques. Such resistive ends may be useful for power dissipation in some applications. View (C) of FIG. 4 shows another embodiment of FPS 400C that has a resistive layer or edge 406 instead of the resistive ends 404 shown previously (though both such resistive elements may be used for a single FPS). A resistive layer may be disposed along or adjacent to a perimeter of the FPS, or may be adjacent to an entire side of the FPS or portions of a side of the FPS.

Figure 5:
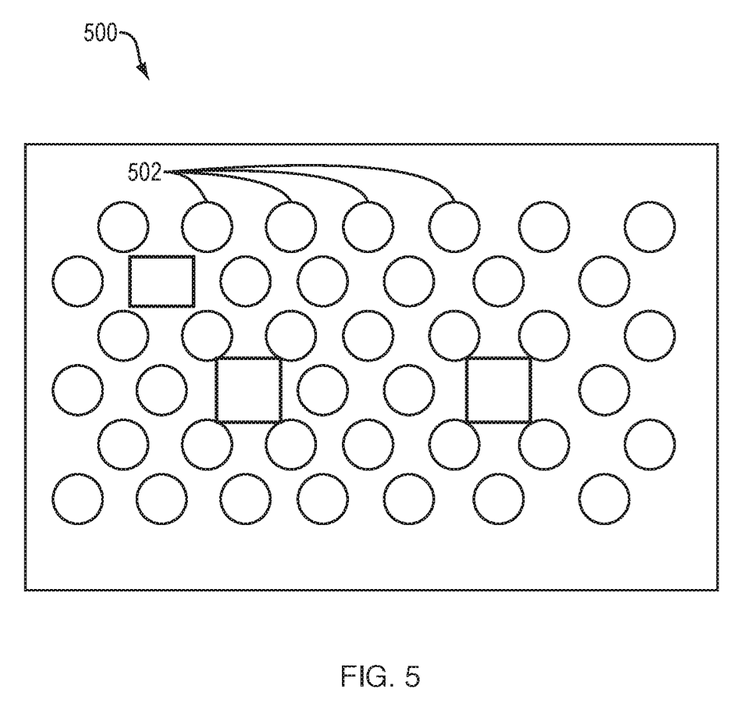
FIG. 5 illustrates the robustness or anti-fragility presented by a FPS under conditions where some fractal cells are damaged or otherwise inoperative.

FIG. 5 illustrates the robustness or anti-fragility presented by a FPS 500 under conditions where some fractal cells are damaged or otherwise inoperative. As show, FPS 500 has a close-packed arrangement of fractal cells, indicated by circles 502. The close-packed arrangement provides many paths by which energy may be transferred from one area of the FPS to another, even in the presence of damaged or otherwise inoperative fractal cells (represented by the black squares shown).

Figure 6:
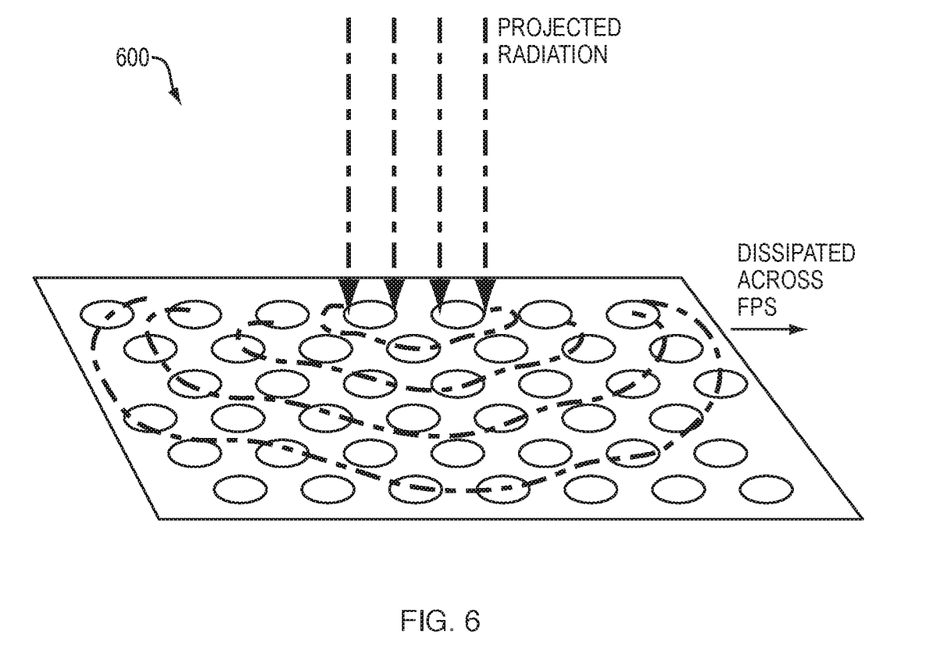
FIG. 6 depicts an example of a FPS used to dissipate incident radiation.

FIG. 6 depicts an example of a FPS 600 used to dissipate incident radiation, which may be directed radiation of high intensity or fluence. As shown, radiation that is incident on a localized area of the FPS 600 is dissipated (indicated by concentric rings) across the surface of the FPS 600 via plasmonic coupling and radiative transfer between the fractal cells 602 of the FPS 600.

While embodiments are shown and described herein as having shells in the shape of concentric rings (circular cylinders), shells can take other shapes in other embodiments. For example, one or more shells could have a generally spherical shape (with minor deviations for structural support). In an exemplary embodiment, the shells could form a nested arrangement of such spherical shapes, around an object to be shielded (at the targeted/selected frequencies/wavelengths). Shell cross-sections of angular shapes, e.g., triangular, hexagonal, while not preferred, may be used.

Figure 7A:
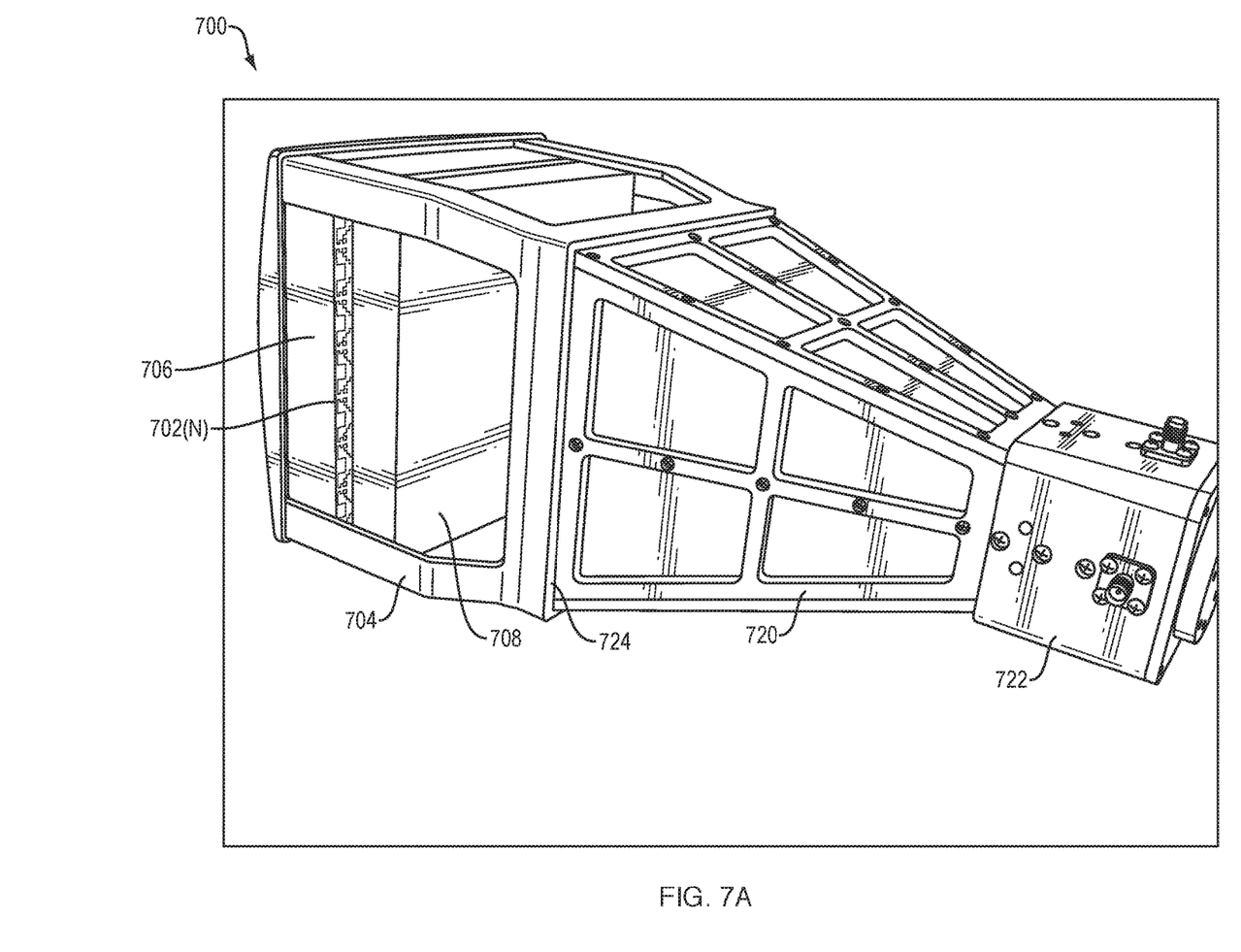
FIGS. 7A-7B depict photographs or photograph-based drawings of an exemplary embodiment of a FPS-card gain-enhancing system in accordance with the present disclosure.
Figure 7B:
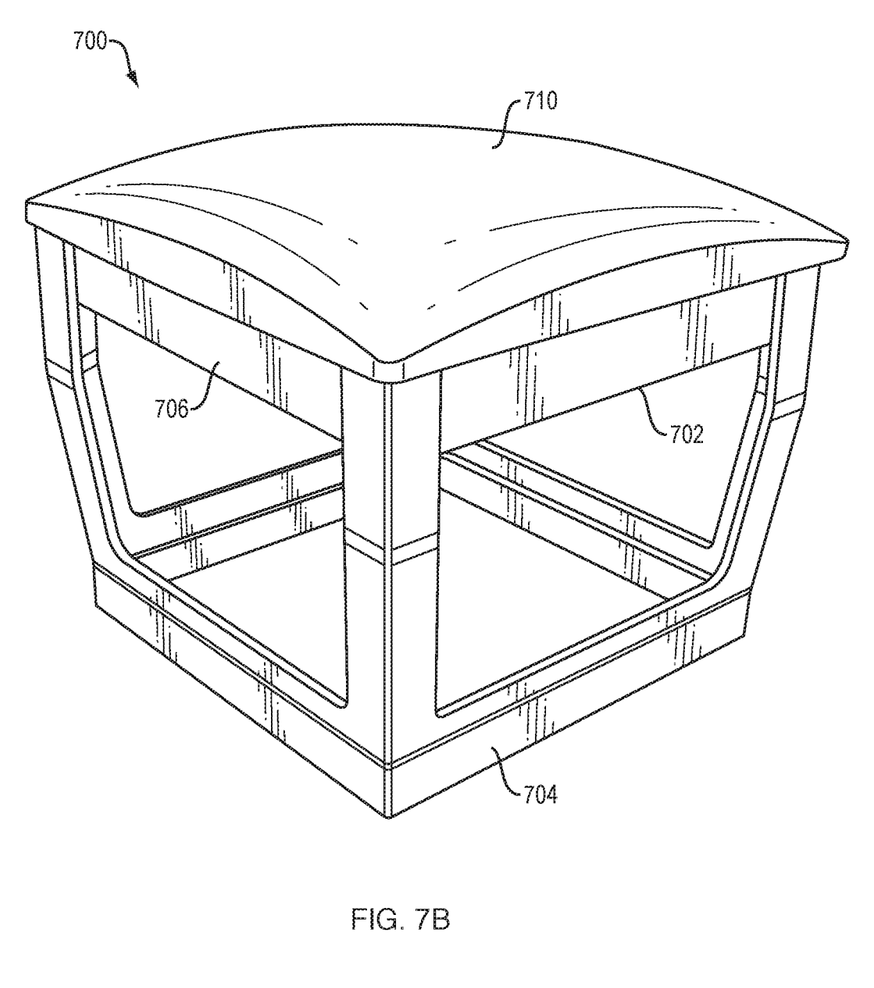

FIGS. 7A and 7B depict an exemplary embodiment of an FPS-card system 700 for enhancing the performance of an antenna. System 700 can include one or more layers or "cards" 702(N=1, 2, 3, 4, etc.) having fractal metamaterials. Such a card 702 may be referred to as a fractal plasmonic surface (FPS) card. Resonator shapes used for a FPS card are preferably fractal. Examples of suitable fractal resonator or cell shapes are shown in FIG. 1. Other suitable fractal resonator shapes for use in a FPS card are disclosed in the above-referenced provisional applications: (i) U.S. Provisional Patent Application No. 61/163,824, filed 26 Mar. 2009 and entitled "Cloaking Techniques"; (ii) U.S. Provisional Patent Application No. 61/163,837, filed 26 Mar. 2009 and entitled "Scatterer"; (iii) U.S. Provisional Patent Application No. 61/163,913, filed 27 Mar. 2009 and entitled "Cloaking Techniques"; and, (iv) U.S. Provisional Patent Application No. 61/237,360, filed 27 Aug. 2009 and entitled "Switching System for Cloak On Command"; the entire contents of all of which applications are incorporated herein by reference.

With continued referenced to FIGS. 7A-7B, the FPS card(s) 702(N) is/are disposed within or held by a frame 704. 702(N) Each card 702 may include a single sheet with a FPS, two non-connected sheets each having an FPS, e.g., with opposite polarizations; or a card 702 may include connected sheet/surface segments configured as a continuous loop or belt, etc. The FPS card or cards 702(N) can be positioned in front of or adjacent to a conventional antenna element, e.g., horn 720 with driven element/feed 722, and aperture 724, as shown. Such a card 702 may be referred to as a fractal plasmonic surface (FPS) card, and may include two non-connected sheets, e.g., with opposite polarizations, or with any desired polarization(s); or a card 702 may include connected sheet/surface segments such as a continuous loop or belt, etc. In preferred embodiments, a card 702 includes a support structure, e.g., made of FR4, with an array of fractal resonators on one or both sides of the structure. Any suitable materials may be used for a card 702. As indicated, an adjacent dielectric layer or dielectric card 706 is preferably used, e.g., positioned adjacent to the one or more FPS cards/layers 702(N), distal to the aperture 724 of the horn antenna 720. A separate dielectric layer or card 708 may be used in alternative or addition to card 706, e.g., positioned between the one or more FPS cards/layers 702(N) and the aperture 724 of the horn antenna 720.

The one or more FPS cards 702(N) and the horn aperture 724 are separated by a separation distance, as shown. Suitable dielectric material(s) may be employed over this separation distance, e.g., air and/or other dielectric material(s). A separation distance between an aperture of the preexisting antenna and one or more cards 702 is preferably in the range of about 0.1 to about 0.3 wavelengths at the lowest desired operating frequency (longest operating wavelength) of the antenna 720.

As noted previously, representative frequencies of operation for system 700 can include, but are not limited to, those over a range of 500 MHz to 1.3 GHz, though others may of course be realized: e.g., 5.9 GHz, 600 MHz to 6 GHZ; 3.3 GHz to 4.2 GHz; in millimeter-wave bands, e.g., 24-86 GHz, including 26 GHz, 28 GHz, 38 GHz, and 42 GHz, 27.5-28.35 GHz, 27-40 GHz, 26.5-29.5 GHz, 27.5-28.28 GHz, 24.25-27.f GHz, 37-43.5 GHz, 26.5-27.5 GHz, 24.5-27.5 GHz; as well as bands at (or bracketing) 600 MHz, 700 MHz, 800 MHz, 900 MHz, 1.5 GHz, 2.1 GHz, 2.3 GHz and 2.6 GHz, as just some examples. Operation at other frequencies, including for example those of visible light, infrared, ultraviolet, and as well as microwave EM radiation, e.g., K, Ka, X-bands, etc. may be realized, e.g., by appropriate scaling of dimensions and selection of shape of the resonator elements. In some embodiments, the effects produced by such techniques can include cloaking, obfuscation, obscuration, or invisibility of an object at the noted wavelengths or bands.

Because the FPS cards 702(N) provide gain, system 700 can be used to obtain or facilitate broadband performance (e.g., greater than or equal to 20% bandwidth, e.g., at ½ power) for antennas for which additional gain is desired. System 700 can produce a mode of lensing or gain, e.g., across the antenna aperture 724, that is normal to the electromagnetic wave path, not tangential to it. System 700 can also provide improved directivity of the horn antenna 720, which otherwise, as noted above, would exhibit a spherical beam front. Operation of system 700 does not require electrical power to be supplied through direct (galvanic) connections, and thus can be considered to provide gain passively. System 700 differs from prior art by its use of fractal metamaterials, its wider band performance, and improved gain characteristics over that wider band. In exemplary embodiments, system 700 can be configured as a retrofit kit for application to a preexisting horn antenna or the like, with frame 704 being adapted to fit to or mate with the aperture 724 of the preexisting horn as shown in FIG. 7A.

Figure 8:
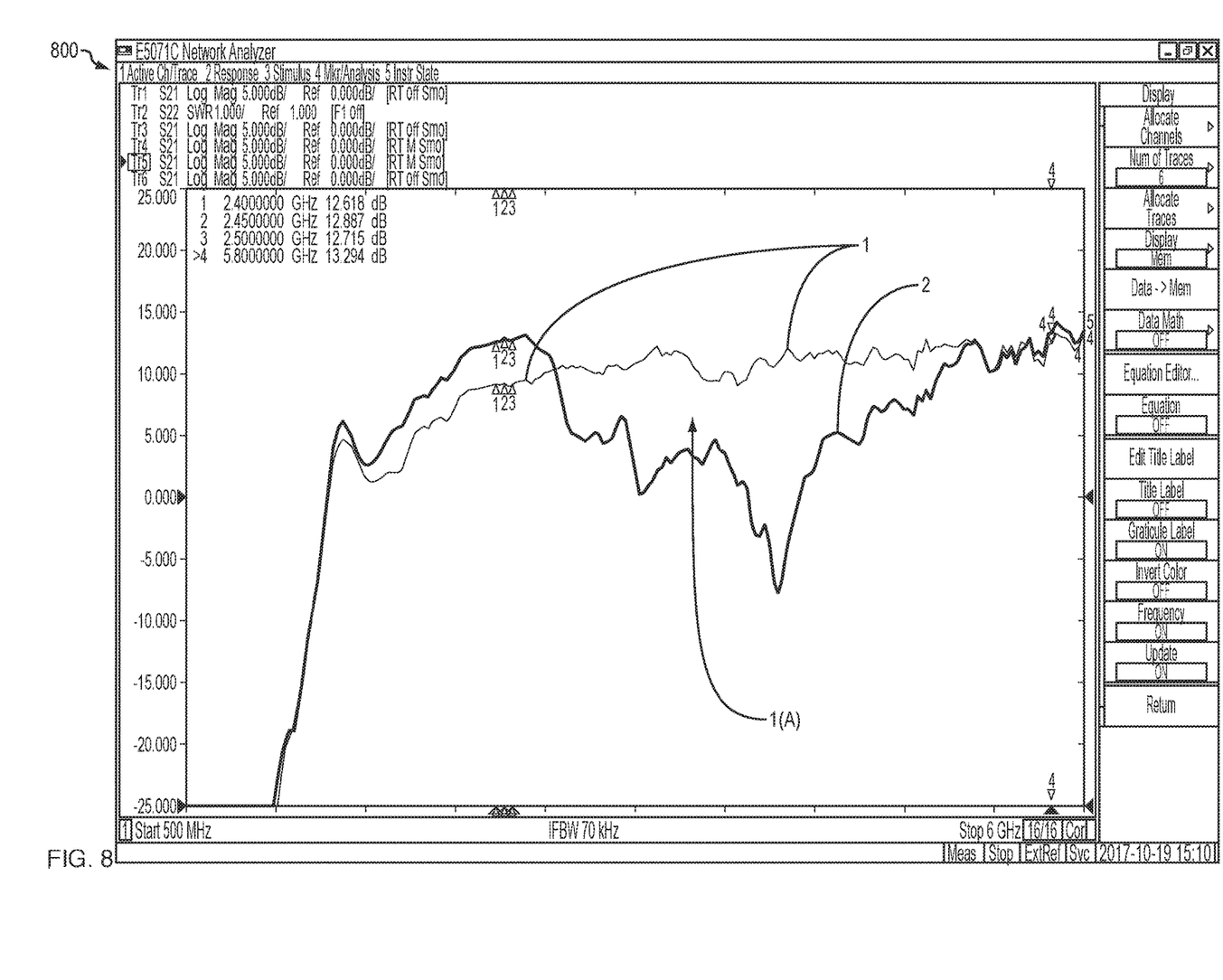
FIG. 8 is a screenshot of a network analyzer displaying the differential gain (difference in gain) achieved between the horn antenna of FIGS. 7A-7B alone and with the horn used in conjunction with the FPS card system of FIGS. 7A-7B.

FIG. 8 is a screenshot 800 of a network analyzer (E5071C) displaying the differential gain (difference in gain) achieved between the horn antenna 720 alone (Trace 1) and with the horn used in conjunction with the additional card system 700 (Trace 2). The frequency range shown starts at 500 MHz and goes to or stops at 6 GHz. As can be seen, the gain of the horn used with FPS card system 700 (Trace 2) shows much-improved wideband gain, though some slight reduction in overall gain is indicated for lower frequencies. Also shown is a marked gain loss (dip) 1A for Trace 1, which is not present for Trace 2.

While FIGS. 7A-B and reference an exemplary application to a rectangular pyramidal horn antenna, the present disclosure is not limited to such. Other embodiments may be used with different types of horn antennas, including but not limited to, sectoral H-plane rectangular horns, sectoral E-plane rectangular horns, exponentially tapered pyramidal rectangular horns, exponentially tapered circular horns, conical circular horns, TEM biconical circular horns, and $TE_{01}$ biconical circular horns; as well as ridge horns, septum horns, corrugated horns, and aperture-matched horns; embodiments of the present disclosure also include application of FPS cards to slot antennas in general, dipoles and monopoles in general, and/or complementary, e.g., self-complementary antennas in general. In addition to application to individual antenna elements, embodiments of the present disclosure may be applied to and used with arrays of antenna elements, e.g., arrays of horns, arrays of slots, arrays of dipoles, and/or arrays of monopoles. Moreover, embodiments may be used with or applied to the following types of antennas, either individually or configured in arrays: Yagi-Uda antennas; flared-notch strip, line-fed radiators; two-dimensional flared-notch arrays, Vivaldi slot line elements; and cavity-backed slots.

Accordingly, embodiments of the present disclosure can provide advantages relative to the prior art. These advantages may include, but are not limited to, [list].

The components, steps, features, objects, benefits, and advantages that have been discussed are merely illustrative. None of them, or the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element proceeded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A system for improving the gain or bandwidth of a preexisting horn antenna having a horn with an aperture having a perimeter, the system comprising:
   one or more fractal plasmonic surfaces configured to be disposed within the perimeter of the aperture of the preexisting horn antenna, wherein the one or more plasmonic surfaces are configured as one or more dielectric cards, respectively; and
   a frame configured to hold the one or more fractal plasmonic surfaces within the perimeter of the aperture of the horn antenna, wherein the frame is adapted to fit the aperture of the horn antenna and hold the one or more fractal plasmonic surfaces within the perimeter of the aperture and fixed with respect to the aperture, and wherein at least one of the one or more fractal plasmonic surfaces is separated from the aperture of the horn antenna by a separation distance.

2. The system of claim 1, wherein each dielectric card is held by the frame.

3. The system of claim 1, wherein each of the one or more fractal plasmonic surfaces includes a plurality of fractal resonators.

4. The system of claim 1, wherein the separation distance is about 0.1 wavelength to about 0.3 wavelength at the lowest desired operating frequency of the antenna.

* * * * *